US008887260B2

(12) United States Patent  (10) Patent No.: US 8,887,260 B2
Marcotte  (45) Date of Patent: Nov. 11, 2014

(54) TOKEN-BASED ACCESS CONTROL

(71) Applicant: Facebook, Inc., Menlo Park, CA (US)

(72) Inventor: Garrett Marcotte, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 142 days.

(21) Appl. No.: 13/660,980

(22) Filed: Oct. 25, 2012

(65) Prior Publication Data

US 2014/0123312 A1    May 1, 2014

(51) Int. Cl.
*H04L 29/06* (2006.01)
*G06F 21/62* (2013.01)

(52) U.S. Cl.
CPC ...................... *G06F 21/62* (2013.01)
USPC .................. 726/9; 726/28; 713/189

(58) Field of Classification Search
CPC ........................................ G06F 21/62
USPC ...................... 726/9, 28; 713/189
See application file for complete search history.

(56) References Cited

U.S. PATENT DOCUMENTS

| | | | |
|---|---|---|---|
| 4,405,829 A | 9/1983 | Rivest et al. | |
| 5,173,939 A | 12/1992 | Abadi et al. | |
| 5,241,599 A | 8/1993 | Bellovin et al. | |
| 5,355,474 A | 10/1994 | Thuraisngham et al. | |
| 5,481,700 A | 1/1996 | Thuraisingham | |
| 5,802,591 A | 9/1998 | Yachida | |
| 5,825,883 A | 10/1998 | Archibald et al. | |
| 5,950,195 A | 9/1999 | Stockwell et al. | |
| 6,055,637 A * | 4/2000 | Hudson et al. | 726/20 |
| 6,088,679 A | 7/2000 | Barkley | |
| 6,148,333 A | 11/2000 | Guedalia et al. | |
| 6,216,231 B1 | 4/2001 | Stubblebine | |
| 6,339,423 B1 | 1/2002 | Sampson et al. | |
| 6,438,614 B2 | 8/2002 | Arnold et al. | |
| 7,174,563 B1 | 2/2007 | Brownlie et al. | |
| 7,653,930 B2 | 1/2010 | Griffin et al. | |
| 8,601,553 B1 * | 12/2013 | Griffin et al. | 726/5 |
| 2003/0229623 A1 | 12/2003 | Chang et al. | |
| 2004/0215650 A1 | 10/2004 | Shaji et al. | |
| 2007/0156659 A1 * | 7/2007 | Lim | 707/3 |
| 2008/0134320 A1 | 6/2008 | Desai et al. | |
| 2009/0133100 A1 | 5/2009 | Buchwald et al. | |

(Continued)

OTHER PUBLICATIONS

"Facebook Ireland Ltd—Report of Audit'", Dec. 21, 2011, Office of the Data Protection Commissioner of Ireland, downloaded on Jun. 27, 2013 at <http://dataprotection.ie/documents/Facebook%20Report/Facebook_Report.pdf>.

*Primary Examiner* — Hadi Armouche
*Assistant Examiner* — Dao Ho
(74) *Attorney, Agent, or Firm* — Perkins Coie LLP (57) ABSTRACT

Systems and methods for enabling token-based access control to data are provided. In particular, some embodiments use a token-based access management system to allow or restrict an individual's ability to access data. The access management system uses tokens to define rules (e.g., a Boolean matching rule or algorithm that results in a true/false output indicating the decision) within the access management system to determine if the token is valid and if the individual should be granted access to the requested data. Tokens may further have tool constraints for controlling access. In some cases, the tokens may expire upon completion of a task or after a pre-set amount of time. A generic workflow utilizing tokens and at least one specific workflow showing employees utilizing tokens as part of performing a task responsive to a user.

18 Claims, 7 Drawing Sheets

(56) References Cited

U.S. PATENT DOCUMENTS

2012/0254957 A1 10/2012 Fork et al.
2012/0311680 A1 12/2012 Lunt
2012/0324543 A1 12/2012 Tam et al.

* cited by examiner

TOKEN-BASED ACCESS CONTROL

TECHNICAL FIELD

Various embodiments of the present invention generally relate to information privacy. More specifically, various embodiments of the present invention relate systems and methods for providing token-based access control to selected portions of data.

BACKGROUND

Companies can store a tremendous amount of end-user data. Examples of end-user data include, but are not limited to, addresses, credit card information, photographs, e-mails, healthcare records, financial records, electronic documents, messages, associations with other end-users, and other types of information. Not only do the end-users have an expectation of privacy, but in many cases there can be legal requirements on the dissemination and use of the data. As a result, unauthorized access and/or use of the end-user's data can result in dissatisfied customers and potential legal liability.

Not only does the data need to be protected from unauthorized access external from the company, but also from unauthorized access internally (e.g., from employees). However, employees of the companies may need access to different data in order to perform their job (e.g., to resolve user issues). Traditional tools for allowing company employees access to end-user data do not typically dynamically allocate access to the data. Instead, each employee may have access to all of the data or to very large portions of the data. Moreover, these traditional tools typically do not provide any restrictions on how the data can be used once access has been granted to the tool. As such, there are a number of challenges and inefficiencies found in traditional tools for granting access to end-user data.

SUMMARY

Systems and methods are described for providing token-based access control to various data sets and/or portions thereof. In some embodiments, a method comprises assigning a set of workflow specific tokens to a user in response to a workflow event (e.g., a request from an end-user to resolve an issue). The set of workflow specific tokens grant one or more users temporary access (e.g., less than twenty-four hours) to selected portions of data. The selected portions of data are typically only the portions of the data needed for the user to respond to the workflow event.

Once a request has been received from a workflow tool to allow the user to access the data, a determination can be made, by using the workflow specific tokens, which portion of the data can be accessed. In some embodiments, a set of default tokens can also be assigned to the user that includes a set of default permissions and/or restrictions to portions of the data. The default tokens can have a higher priority level than the set of workflow specific tokens in some cases. In some cases, a cryptographic message authentication code can be included with each token allowing for a detection of modification or tampering of the tokens.

In some embodiments, a computer-implemented method for providing temporary access to selected portions of end-user data can include generating a set of default tokens for a specific user (e.g., on a periodic or predetermined schedule). Then, a set of workflow tokens can be generated based on a workflow event (e.g., a job needed to be done by the specific user). In some cases, at least some of the workflow tokens are assigned to the specific user to allow the specific user temporary access to selected portions of a data set. Upon receiving a data access request, a determination can be made based on the default tokens and workflow specific tokens assigned to the specific user to which portion of the end-user data can access. In at least one embodiment, a deactivation event can be associated with the workflow token. Then, upon detection of the deactivation event the workflow token can be deactivated.

Embodiments of the present invention also include computer-readable storage media containing sets of instructions to cause one or more processors to perform the methods, variations of the methods, and other operations described herein.

Various embodiments of the present invention can include a token-based access management system having a processor, memory, database, workflow engine, communications module, and other modules, components, and/or tools. In some embodiments, the database can have a plurality of end-user data stored thereon. The workflow engine can be configured to receive an event (e.g., a request from one of the end-users to resolve a problem or complaint) and generate a workflow specific token to temporarily grant access to a portion of the data in order to respond to the event. The communications module can be configured to associate the workflow specific token with a user (e.g., an employee of a company). The user can then use a set of tools configured to access the workflow specific token, verify that the user should be granted access to the portion of the data, and allow the user to access the portion of the data. In some cases, the set of tools may have additional tools constraints restricting access to the portion of the data even further.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to information privacy. More specifically, various embodiments of the present invention relate systems and methods for providing token-based access control to various portions of information, action logs, end-user information, and/or other data sets. Traditionally, companies that have stored end-user data have used systems that allow employees unrestricted access to all (or at least large portions) of the end-user data in order to resolve user issues. Moreover, these traditional tools typically do not provide any restrictions on how the data can be used once access has been granted to the tool.

In contrast, various embodiments of the present invention allow for the dynamic allocation of temporary access to selected portions of end-user data, company data, and/or analytics generated by the company based on a need of the employee to perform job duties. In some embodiments, unique tokens (e.g., system objects encapsulating security information and/or descriptors) can be issued to each employee. These tokens can include default tokens that restrict certain access (e.g., access to data relating to other employees) or workflow tokens that temporarily grant specific access to specific portions of the data subject to the default token restrictions.

For example, in context of a social networking company, an end-user may request a resolution to a problem such as an inappropriate post that violates the policies of the social network. In order for an employee to resolve the problem they may need temporarily granted access to the post. This event (i.e., the end-user request) triggers a set of workflow tokens being generated that provide an employee access to the post along with other data in order to determine if the post actually was inappropriate and if other violations have occurred. After a period of time (e.g., twelve or twenty-four hours) or upon completion of the task, the employee's access to the data can be removed.

While, for convenience, embodiments of the present invention are described with reference to employee access to selected portions of end-user data, company data, and/or analytics, embodiments of the present invention are equally applicable to various other applications. For example, these techniques are equally applicable to an end-user system to allow end-users to selectively allow other end-users temporary access to portions of data. In addition, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

TERMINOLOGY

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary channels or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

General Description

Figure 1:
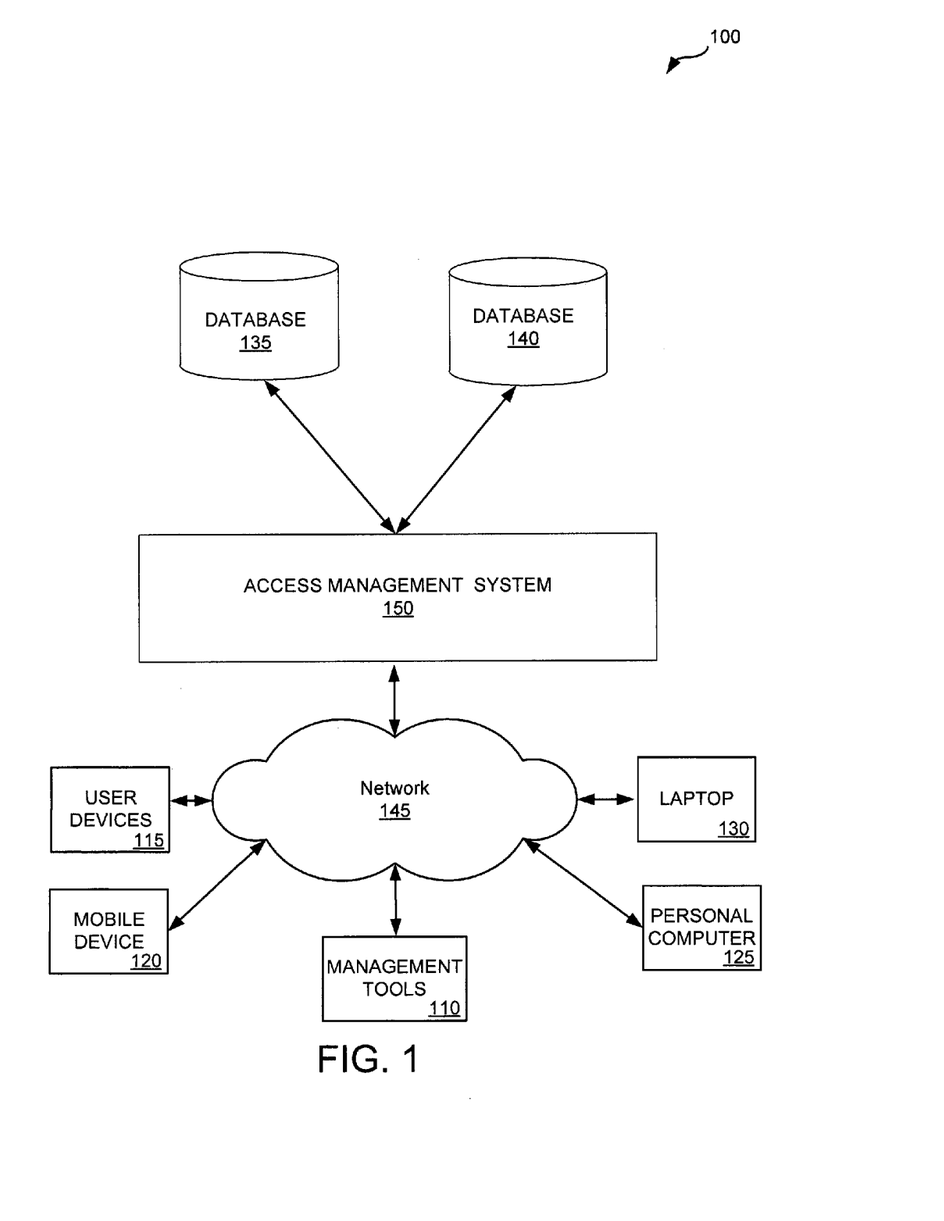
FIG. 1 illustrates an example of a networked-based environment in which some embodiments of the present invention may be utilized.

FIG. 1 illustrates an example of a networked-based environment 100 in which some embodiments of the present invention may be utilized. Companies can store a tremendous amount of data (e.g., photographs, messages, e-mails, electronic documents, or healthcare records) and related analytics (e.g., usage analytics). The data can be submitted through various management tools 110, user devices 115, mobile devices 120, personal computers 125, laptops 130, and/or other devices to allow the data to be stored on one or more databases 135 and 140. As illustrated in FIG. 1, these devices and tools may use network 145 to submit and retrieve information from the databases 135 and 140. Various embodiments of the present use access management system 150 to manage the access the users (both end-users and employees) have to the information and data stored on databases 135 and 140.

User device 115 can be any computing device capable of receiving user input as well as transmitting and/or receiving data via the network 145. In one embodiment, user device 115 is a conventional computer system, such as a desktop 125 or laptop computer 130. In another embodiment, user device 115 may be mobile device 120 having computer functionality, such as a personal digital assistant (PDA), mobile telephone, smart-phone or similar device. User device 115 is configured to communicate with access management system 150, and/or the financial account provider via the network 145. In one embodiment, user device 115 executes an application allowing a user of user device 115 to interact with the access management system 150. For example, user device 115 can execute a browser application to enable interaction between the user device 115 and access management system 150 via the network 145. In another embodiment, user device 115 interacts with access management system 150 through an application programming interface (API) that runs on the native operating system of the user device 115, such as IOS® or ANDROID™.

User devices 115 can be configured to communicate via the network 145, which may comprise any combination of local area and/or wide area networks, using both wired and wireless communication systems. In one embodiment, network 145 uses standard communications technologies and/or protocols. Thus, network 145 may include links using technologies such as Ethernet, 802.11, worldwide interoperability for microwave access (WiMAX), 3G, 4G, CDMA, digital subscriber line (DSL), etc. Similarly, the networking protocols used on network 145 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 145 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

Figure 2:
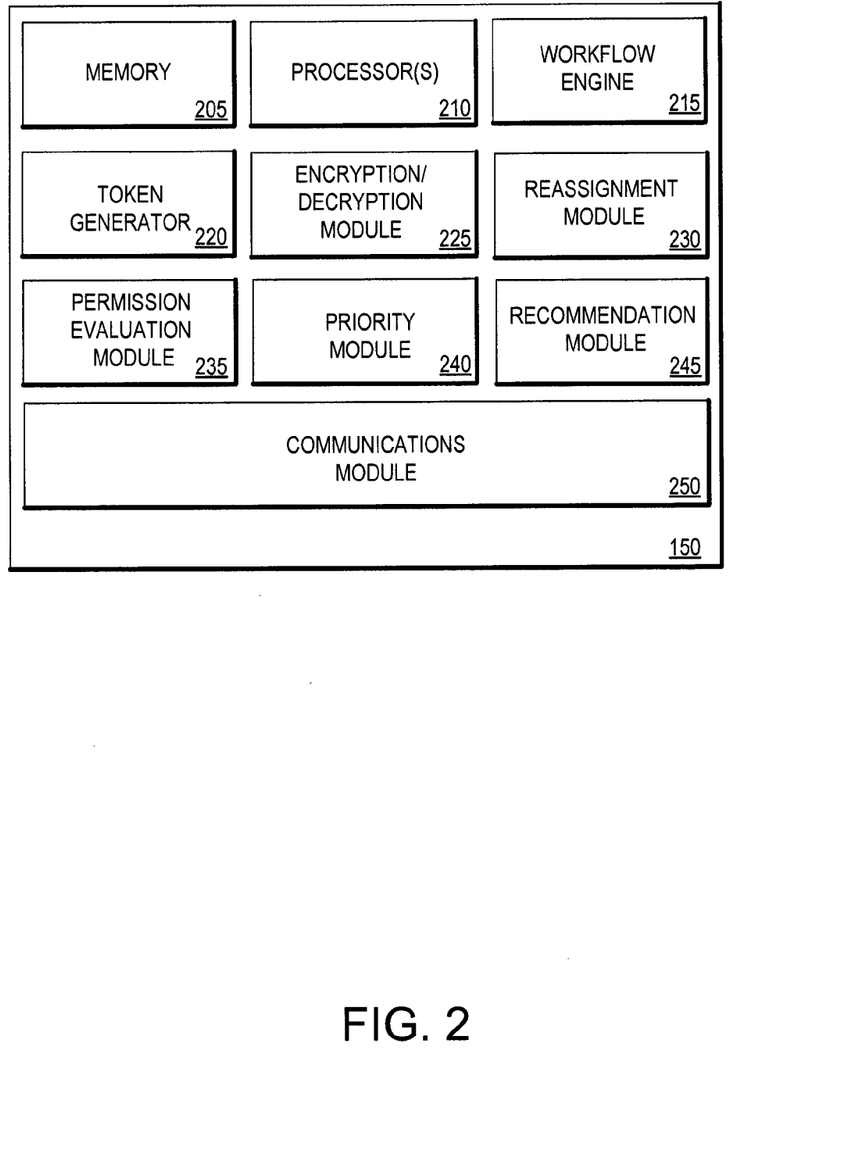
FIG. 2 shows a block diagram with components of an access management system in accordance with one or more embodiments of the present invention.

FIG. 2 shows a block diagram with components of an access management system 150 in accordance with one or more embodiments of the present invention. According to the embodiments shown in FIG. 2, the system can include memory 205, one or more processors 210, workflow engine 215, token generator 220, encryption/decryption module 225, reassignment module 230, permission evaluation module 235, priority module 240, recommendation module 245, and communications module 250. Other embodiments of the present invention may include some, all, or none of these modules and components along with other modules, applications, and/or components. Still yet, some embodiments may incorporate two or more of these modules into a single module and/or associate a portion of the functionality of one or more of these modules with a different module. For example, in one embodiment, workflow engine 215 and token generator 220 can be combined into a single module for processing workflow events.

Memory 205 can be any device, mechanism, or populated data structure used for storing information. In accordance with some embodiments of the present invention, memory 205 can encompass any type of, but is not limited to, volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of workflow engine 215, token generator 220, encryption/decryption module 225, reassignment module 230, permission evaluation module 235, priority module 240, recommendation module 245, and communications module 250.

In some embodiments, workflow engine 215 can be configured to receive an event (e.g., request from an end-user) and generate a workflow associated with the event. The workflow can include one or more specific tasks along with deadlines for completion. In addition to the workflow, workflow engine 215 can use token generator 220 to generate one or more workflow specific tokens to temporarily grant a user access to a portion of the data in order to respond to the event based on the created workflow. A workflow management tool can also be a part of, or coupled to, workflow engine 215 in some embodiments. The workflow management tool can monitor the status of workflow and can receive requests from the user to extend/end token availability.

Token generator 220 can generate default tokens in addition to the workflow specific tokens requested by workflow engine 215. Default tokens can include a set of default permissions and/or restrictions. These default tokens can be created and assigned to individual users based on company policies, job titles, job duties, and/or any other criteria. The tokens can be associated with each user's profile. In some embodiments, the tokens may be nontransferable and identify the assigned user, user groups that the assigned user belongs to, along with other information. This additional information can provide an additional security measure to prevent the transfer of tokens from one employee to another.

In some embodiments, portions of the data can include unique data identifiers which can be specified within the tokens. In other cases, metadata or other data associations (e.g., all users in China) can be specified within the token in order to identify portions of data to which a rule will apply. This information can be used in verifying and determining which portions of the data the user can access.

In some embodiments, the tokens generated by token generator 220 are permission objects that match identifiers according to some pre-configured matching rule (e.g., a Boolean matching rule or algorithm that results in a true/false output indicating the decision). This matching rule can then be used to either allow or deny access to data in a granular fashion. In addition, some embodiments provide for different types of tokens. For example, a social networking company may issue an identification permission token, a friend permission token, and an employee token. The identification permission token may match only a single ID. The friend permission token may match a user ID and all the friends of that user ID.

The employee token matches any employee of the company. By combining the different types of tokens different policies can be enforced. For example "Employee A can access his own data, but cannot access data of other employees or any of his friends." Then if A starts working on an issue reported by user B, we could allow A to access data from B and all of B's Friends, but not any arbitrary user.

In some embodiments, token generator 220 can use encryption/decryption module 225 to assign a cryptographic message authentication code to the tokens. The system can then authenticate the cryptographic message authentication code before allowing the user to access any portion of the data. In many embodiments, the tokens will also include an expiration indicator. The expiration indicator can identify a time of expiration (e.g., day and time), an event triggered expiration (e.g., completion of task), a maximum amount of time to access the data (e.g., one hour of access time), and/or other expiration indicators or triggers.

Reassignment module 230 can be configured to receive a request from the user to reassign a portion of the workflow and/or event to a second user. In some embodiments, the request from the user can be to reassign the portion of the workflow and/or event to a different team within the company or into a different workflow processor. For example, suppose an event requesting removal of an inappropriate post from a social networking site is received. The workflow generator can assign a first user to resolve the issue. However, upon attempting to resolve the issue, the user realizes that the request should be reassigned to a different team or individual within the company, the first user can submit a request to that end.

Permission evaluation module 235 can be configured to receive and evaluate a request from the user to access an additional portion of the data in order to respond to the event or workflow assignment. In some cases, upon trying to respond to the event, a user may realize that access to additional information is needed. This request can be submitted to permission evaluation module 235. Various embodiments generate one or more graphical user interface screens in response to the users request. These screens allow the user to provide more information regarding the request.

Depending on the nature of the request, permission may be granted or escalated for review by a manager or other decision maker. In one embodiment, permission evaluation module may suggest one or more individuals to which the event or workflow portion can be reassigned. The reassignment may happen automatically or only upon request from the user.

Priority module 240 can be configured to resolve access permissions based on multiple specific tokens assigned to the user. For example, in some situations the rules may conflict which one token granting access while another token would restrict access to a certain data portion. For example, in some embodiments, the tokens may have an embedded priority level which can be used by priority module 240 to resolve conflicts. In at least one embodiment, additional conflict resolution policies and/or rules for resolving the conflicts may be used. Recommendation module 245 monitors conflicts and requests for additional permissions from employees. Recommendation module 245 analyzes the conflicts and requests for additional permissions and provides recommendations for which permissions and data access should be associated with workflow events.

Communications module 250, in one or more embodiments of the present invention, can be used to associate the workflow specific tokens and default tokens with a user. For example, this may be done by sending a message to a token assignment database to record which tokens have been assigned to an individual. As another example, communications module 250 may associate the tokens with the user's profile. In some embodiments, communications module 250 may translate messages between different formats and/or manage communications between various components.

Figure 3:
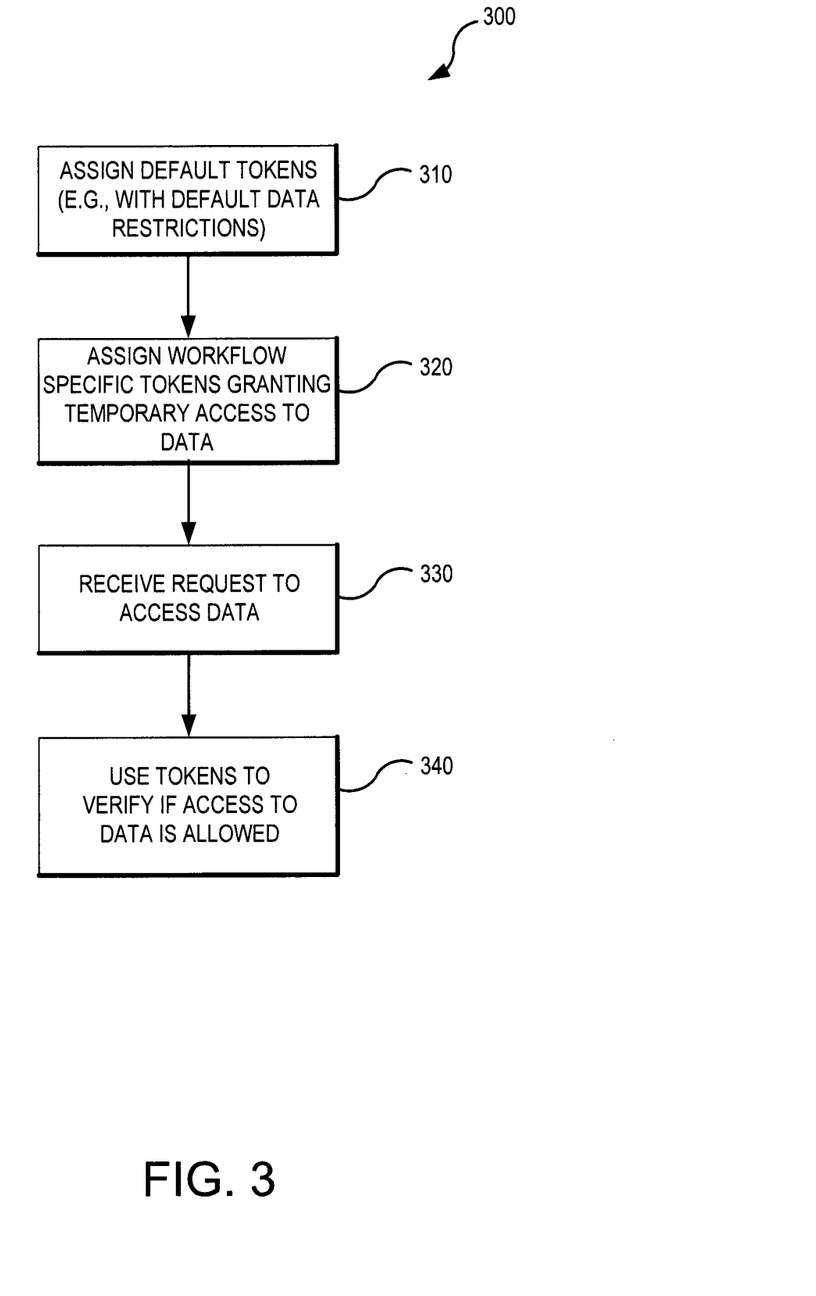
FIG. 3 is a flowchart with a set of operations for operating a token-based access management system in accordance with various embodiments of the present invention.

FIG. 3 is a flowchart with a set of operations for operating a token-based access management system in accordance with various embodiments of the present invention. The operations illustrated in FIG. 3 may be performed in various embodiments by workflow engine 215, token generator 220, a processor, and/or other modules, engines, components or tools associated with access management system 150. As illustrated in FIG. 3, during default assignment operation 310, a default set of tokens can be assigned to individuals (e.g., company employees). Default assignment operation 310 may occur on a predefined schedule (e.g., daily, weekly, or monthly). The default set of tokens can provide a set of restrictions and/or permissions for an individual user to access various data sets. For example, the default set of tokens may restrict access to any data pertaining to other employees within the company. In some cases, default tokens can be assigned based on job titles and/or employee duties and responsibilities.

Specific token assignment operation 320 assigns workflow specific tokens to individual users. These workflow specific tokens can temporarily grant access to a partition or slice of a data set. For example, in the context of a social networking site, an end-user may request resolution to a problem. Depending on the nature of the problem, an employee of the social networking site may need to be granted internal access to the data of the end-user and the friends of the end-user in order to be able to resolve the problem. In some embodiments, the default and/or workflow specific tokens can be assigned a priority level, and thus some tokens may override any permission granted by other tokens. In various embodiments, the priority levels may be included within the token. In other embodiments, the priority levels may be stored separately (e.g., within a token priority database).

Once a user has been assigned to handle an event (e.g., a request from an end-user to resolve a problem), the user can submit a request to access data. Once the access management system receives a request to access a portion of the data at receiving operation 330, verification operation 340 uses the tokens to verify if access to the data is allowed. For example, verification operation 340 can determine and verify if the tokens have expired, if the correct user is using the tokens, if the tokens have not been tampered with (e.g., using the cryptographic MAC), etc.

Figure 4:
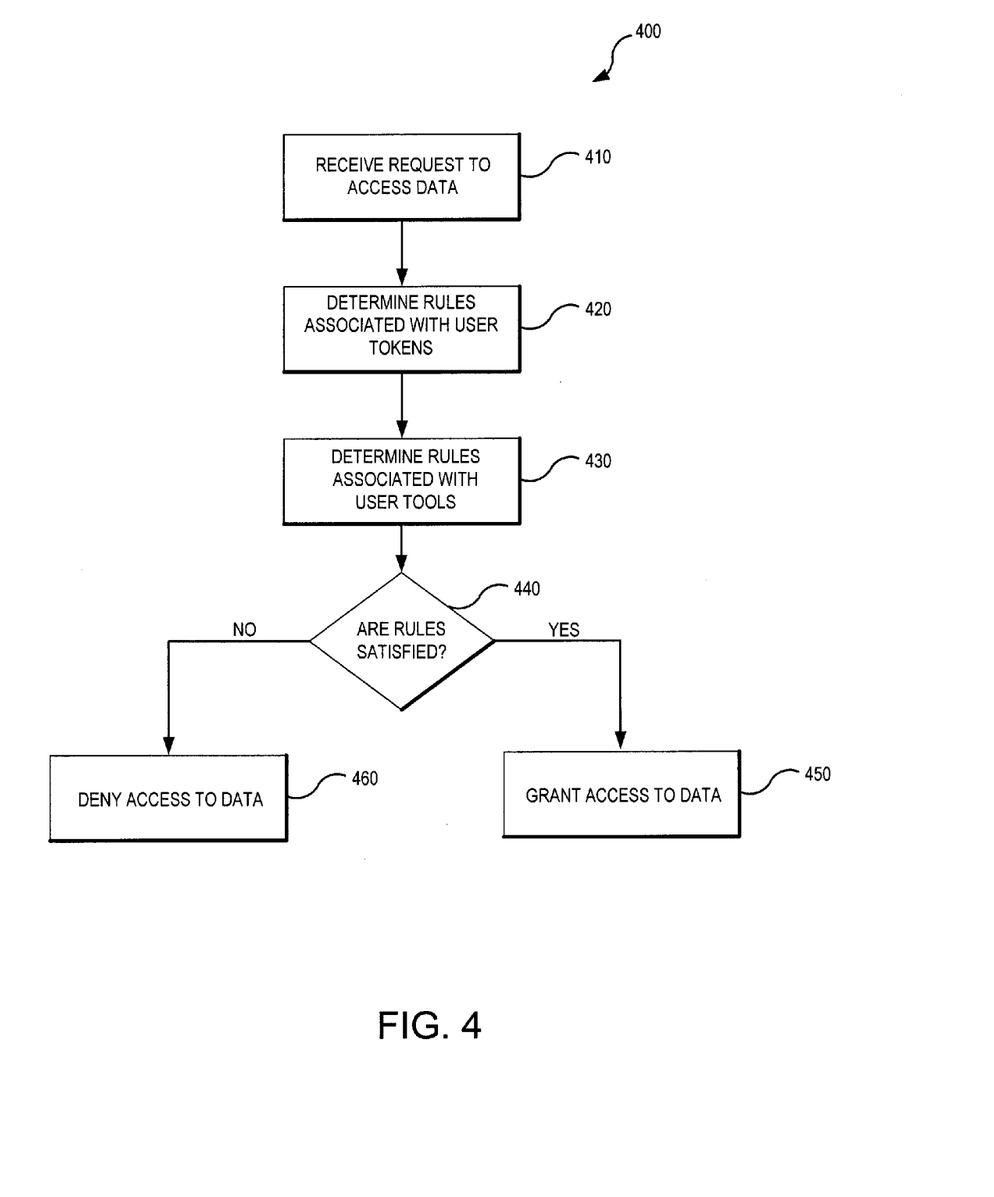
FIG. 4 is a flowchart with a set of operations for determining if a user should be granted access to a portion of data in accordance with some embodiments of the present invention.

FIG. 4 is a flowchart with a set of operations 400 for determining if a user should be granted access to a portion of data in accordance with some embodiments of the present invention. The operations illustrated in FIG. 4 may be performed in various embodiments by workflow engine 215, communications module 250, a processor, and/or other modules, engines, tools or components of the access management system. As illustrated in FIG. 4, during receiving operation 410, access management system 150 can receive a request to access a portion of the data. In some embodiments, the request can originate from a user (e.g., employee) using a tool for accessing the data. Determination operation 420 determines the rules associated with each of the user's tokens. In some cases, the tool used by the user may have additional rules for accessing data which can be determined by tool rule operation 430. For example, in the case of financial services, the tool may only allow access to transactions within a specified period of time.

Once the rules have been identified, compliance operation 440 verifies that the rules for accessing the data are satisfied. If the rules are satisfied, the compliance operation 440 branches to access operation 450 where access to the data is granted. If compliance operation 440 determines that the rules are not satisfied, then the operation branches to denial operation 460. In some embodiments, access operation 450 and denial operation 460 may be applied to individual portions of the data within any given request. As such, some of the data being request may be accessed while other portions of the data may not be accessed. In other embodiments, access operation 450 and denial operation 460 may be applied to the entire request. In those cases, if a user is not authorized to access any portion of the data being requested, then the entire request is denied.

Figure 5:
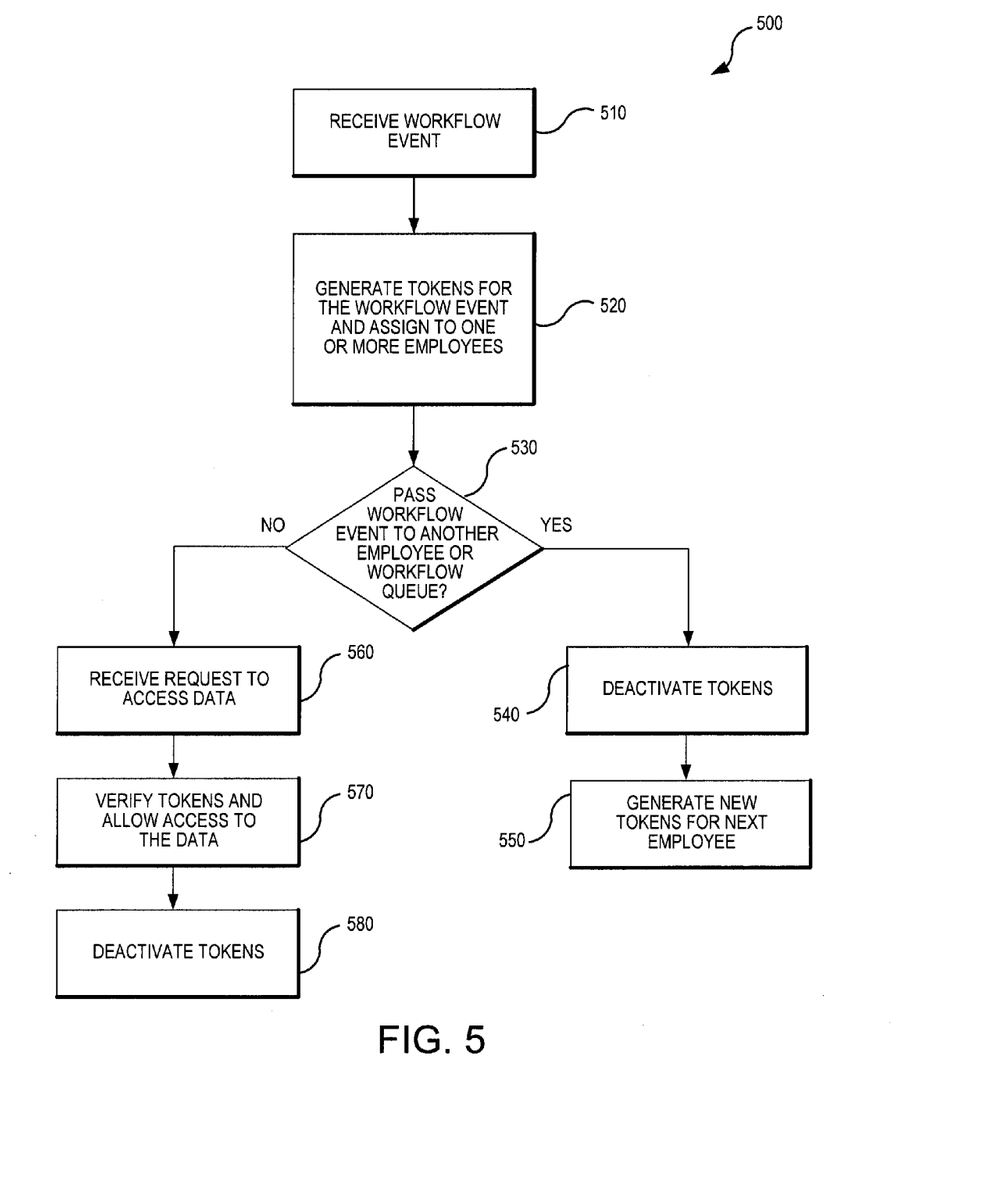
FIG. 5 is a flowchart with a set of operations for processing a workflow event in accordance with various embodiments of the present invention.

FIG. 5 is a flowchart with a set of operations 500 for processing a workflow event in accordance with various embodiments of the present invention. The operations illustrated in FIG. 5 may be performed in various embodiments by workflow engine 215, token generator 220, reassignment module 230, a processor, and/or other modules, engines, components or tools associated with access management system 150. As illustrated in FIG. 5, receiving operation 510 can receive a workflow event. The workflow event can be any request, signal, message, or other indicator for initiating a workflow to perform an action. In some embodiments, the workflow event can be received at communications module 250 and passed to workflow engine 215. Workflow engine can examine the workflow event and determine one or more actions that are needed. These actions, which may require access to different portions of the data, can then be assigned to one or more individuals based on current workload, skill sets, job title, and other criteria.

Assignment operation 520 then generates and assigns the tokens to one or more employees. In some cases, an employee may not be able to complete the portion of the workflow assigned to them. Various embodiments of the present invention, allow for employees to send a request for their task to be reassigned. Determination operation 530 determines if the workflow event/action should be passed to another employee or added to a workflow queue. When determination operation 530 determines that a pass should be generated, operation 530 branches to deactivation operation 540 which deactivates the tokens assigned to the individual for the workflow event/action being passed to another employee. Once the tokens have been deactivated, generation operation 550 generates new tokens for the next employee assigned to the workflow event/action.

When determination operation 530 determines that the workflow event/action should not be passed, operation 530 branches to receiving operation 560 where a request to access the data is received. Once the request has been received, verification operation 570 verifies that the tokens provide sufficient privileges to access the data. In some cases, where multiple tokens have been generated with conflicting instructions, verification operation 570 may use priority module 240 to determine which permissions and restrictions have a higher priority level. Once the task has been completed and/or a preset expiration period has been reached, deactivation 580 deactivates the tokens.

Social Networking System Architecture

As mentioned above, embodiments of the present invention can be utilized within a social networking system. Typically, a social networking system includes one or more computing devices storing user profiles associated with users and/or other objects as well as connections between users and other users and/or objects. In use, users join the social networking system and then add connections to other users or objects of the social networking system to which they desire to be connected. The users may be individuals or entities such as businesses, organizations, universities, manufacturers. The social networking system allows its users to interact with each other as well as with other objects maintained by the social networking system. In some embodiments, the social networking system allows users to interact with third-party websites and financial account providers.

Based on stored data about users, objects and connections between users and/or objects, the social networking system can generate and maintain a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system can modify edges connecting the various nodes to reflect the interactions.

Figure 6:
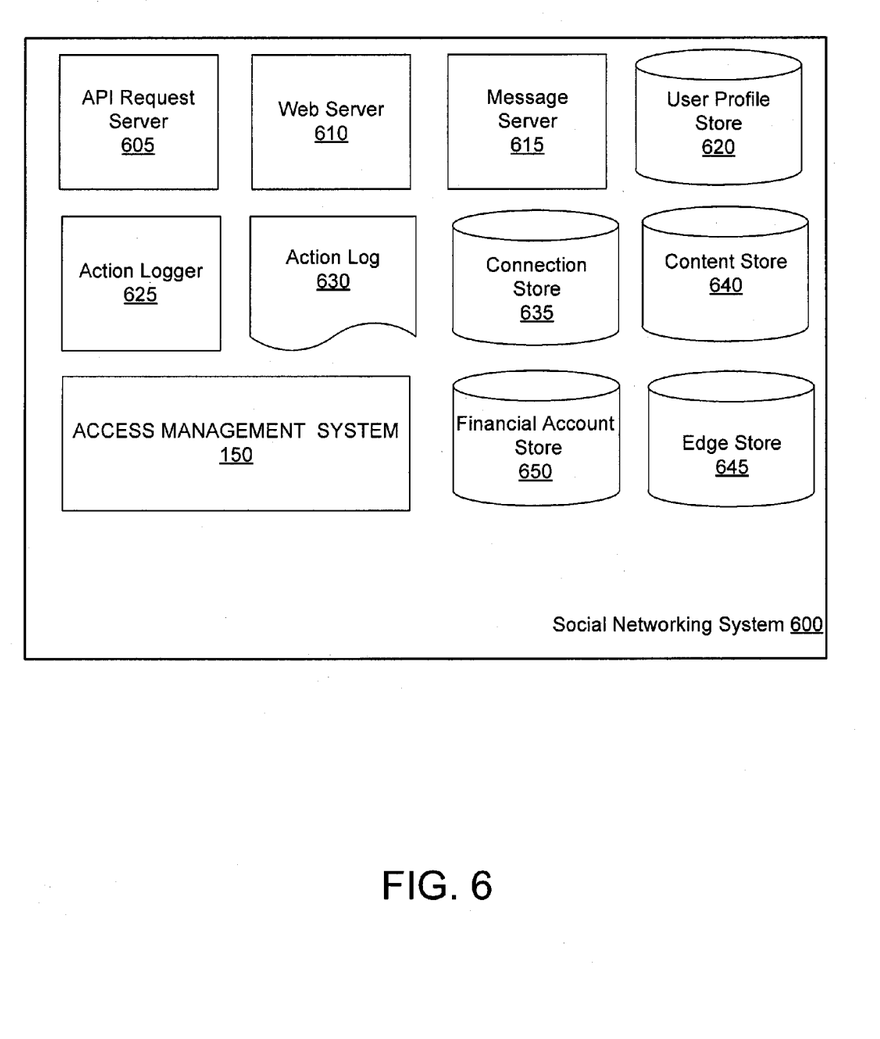
FIG. 6 is a block diagram of a system architecture of the social networking system with which some embodiments of the present invention may be utilized.

FIG. 6 is a block diagram of a system architecture of the social networking system 600 with which some embodiments of the present invention may be utilized. Social networking system 600 illustrated by FIG. 6 includes API request server 605, web server 610, message server 615, user profile store 620, action logger 625, action log 630, connection store 635, content store 640, edge store 645, and financial account store 650. In other embodiments, social networking system 600 may include additional, fewer, or different modules for various applications. Conventional components such as network interfaces, security mechanisms, load balancers, failover servers, management and network operations consoles, and the like are not shown so as to not obscure the details of the system architecture.

API request server 605 allows other systems, user devices, or tools to access information from social networking system 600 by calling APIs. The information provided by the social network may include user profile information or the connection information of users as determined by their individual privacy settings. For example, a system, user device, or tools interested in accessing data connections within a social networking system may send an API request to social networking system 600 via a network. The API request is received at social networking system 600 by API request server 605. API request server 605 processes the request by submitting the access request to access management system 150 where access is determined and any data is communicated back to the requesting system, user device, or tools via a network.

Web server 610 links social networking system 600 via a network to one or more client devices; the web server serves web pages, as well as other web-related content, such as Java, Flash, XML, and so forth. The web server 610 may communicate with the message server 615 that provides the functionality of receiving and routing messages between social networking system 600 and client devices. The messages processed by message server 615 can be instant messages, queued messages (e.g., email), text and SMS (short message service) messages, or any other suitable messaging technique. In some embodiments, a message sent by a user to another can be viewed by other users of social networking system 600, for example, by the connections of the user receiving the message. An example of a type of message that can be viewed by other users of the social networking system besides the recipient of the message is a wall post. In some embodiments, a user can send a private message to another user that can only be retrieved by the other user.

Each user of the social networking system 600 is associated with a user profile, which is stored in user profile store 620. A user profile includes declarative information about the user that was explicitly shared by the user, and may also include profile information inferred by social networking system 600. In one embodiment, a user profile includes multiple data fields, each data field describing one or more attributes of the corresponding user of social networking system 600. The user profile information stored in user profile store 620 describes the users of social networking system 600, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of social networking system 600 displayed in an image. A user profile in user profile store 620 may also maintain references to actions by the corresponding user performed on content items in content store 640 and stored in the edge store 645.

A user profile may be associated with one or more financial accounts, allowing the user profile to include data retrieved from or derived from a financial account. A user may specify one or more privacy settings, which are stored in the user profile, that limit information from a financial account that social networking system 600 is permitted to access. For example, a privacy setting limits social networking system 600 to accessing the transaction history of the financial account and not the current account balance. As another example, a privacy setting limits social networking system 600 to a subset of the transaction history of the financial account, allowing social networking system 600 to access transactions within a specified time range, transactions involving less than a threshold transaction amount, transactions associated with specified vendor identifiers, transactions associated with vendor identifiers other than specified vendor identifiers or any suitable criteria limiting information from a financial account identified by a user that is accessible by social networking system 600. In one embodiment, information from the financial account is stored in user profile store 620. In other embodiments, it may be stored in financial account store 650.

Action logger 625 receives communications about user actions on and/or off social networking system 600, populating action log 630 with information about user actions. Such actions may include, for example, adding a connection to another user, sending a message to another user, uploading an image, reading a message from another user, viewing content associated with another user, attending an event posted by another user, among others. In some embodiments, action logger 625 receives, subject to one or more privacy settings, transaction information from a financial account associated with a user and identifies user actions from the transaction information. For example, action logger 625 retrieves vendor identifiers from the financial account's transaction history and identifies an object, such as a page, in social networking system 600 associated with the vendor identifier. This allows action logger 625 to identify a user's purchases of products or services that are associated with a page, or another object, in content store 640. In addition, a number of actions described in connection with other objects are directed at particular users, so these actions are associated with those users as well. These actions are stored in action log 630.

Action log 630 may be used by social networking system 600 to track user actions on social networking system 600, as well as external websites that communicate information to social networking system 600. Users may interact with various objects on social networking system 600, including commenting on posts, sharing links, and checking-in to physical locations via a mobile device, accessing content items in a sequence or other interactions. Information describing these actions is stored in action log 630. Additional examples of interactions with objects on social networking system 600 included in action log 630 include commenting on a photo album, communications between users, becoming a fan of a musician, adding an event to a calendar, joining a group, becoming a fan of a brand page, creating an event, authorizing an application, using an application and engaging in a transaction. Additionally, action log 630 records a user's interactions with advertisements on social networking system 600 as well as other applications operating on social networking system 600. In some embodiments, data from action log 630 is used to infer interests or preferences of the user, augmenting the interests included in the user profile and allowing a more complete understanding of user preferences.

Action log 630 may also store user actions taken on external websites and/or determined from a financial account associated with the user. For example, an e-commerce website that primarily sells sporting equipment at bargain prices may recognize a user of social networking system 600 through social plug-ins that enable the e-commerce website to identify the user of social networking system 600. Because users of social networking system 600 are uniquely identifiable, e-commerce websites, such as this sporting equipment retailer, may use the information about these users as they visit their websites. Action log 630 records data about these users, including webpage viewing histories, advertisements that were engaged, purchases made, and other patterns from shopping and buying. Actions identified by action logger 625 from the transaction history of a financial account associated with the user allow action log 630 to record further information about additional types of user actions.

In some embodiments, social networking system 600 further stores data describing one or more connections between different users in the connection store 635. The data describing one or more connections can include a list of connections, a date each connection (i.e., friendship) was made, etc. The connections may be further defined by users, allowing users to specify their relationships with other users. For example, the connections allow users to generate relationships with other users that parallel the users' real-life relationships, such as friends, co-workers, partners, and so forth. In one embodiment, the connection specifies a connection type based on the type of relationship. Examples of the type of relationship include family, friend, colleague, etc. Users may select from predefined types of connections, or define their own connection types as needed. Some or all of this information may also be stored as edge objects in edge store 645.

Content store 640 stores content items associated with a user profile, such as images, videos or audio files. Content items from content store 640 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of social networking system 600. Examples of social networking content items include suggested connections or suggestions to perform other actions, media provided to, or maintained by, social networking system 600 (e.g., pictures or videos), status messages or links posted by users to the social networking system, events, groups, pages (e.g., representing an organization or commercial entity), and any other content provided by, or accessible via, the social networking system.

Content store 640 also includes one or more pages associated with entities having user profiles in user profile store 620. An entity is a non-individual user of social networking system 600, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in content store 640, allowing social networking system users to more easily interact with the vendor via social networking system 600. A vendor identifier is associated with a vendor's page, allowing social networking system 600 to identify the vendor and/or to retrieve additional information about the vendor from user profile store 620, action log 630 or from any other suitable source using the vendor identifier. In some embodiments, the content store 640 may also store one or more targeting criteria associated with stored objects and identifying one or more characteristics of a user to which the object is eligible to be presented.

In one embodiment, edge store 645 stores the information describing connections between users and other objects on social networking system 600 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in social networking system 600, such as expressing interest in a page on the social networking system, sharing a link with other users of the social networking system, and commenting on posts made by other users of the social networking system. Edge store 645 stores edge objects that include information about the edge, such as affinity scores for objects, interests, and other users. Affinity scores may be computed by social networking system 600 over time to approximate a user's affinity for an object, interest, and other users in social networking system 600 based on the actions performed by the user. Multiple interactions between a user and a specific object may be stored in one edge object in edge store 645, in one embodiment. In some embodiments, connections between users may be stored in user profile store 620, or user profile store 620 may access edge store 645 to determine connections between users.

Exemplary Computer System Overview

Figure 7:
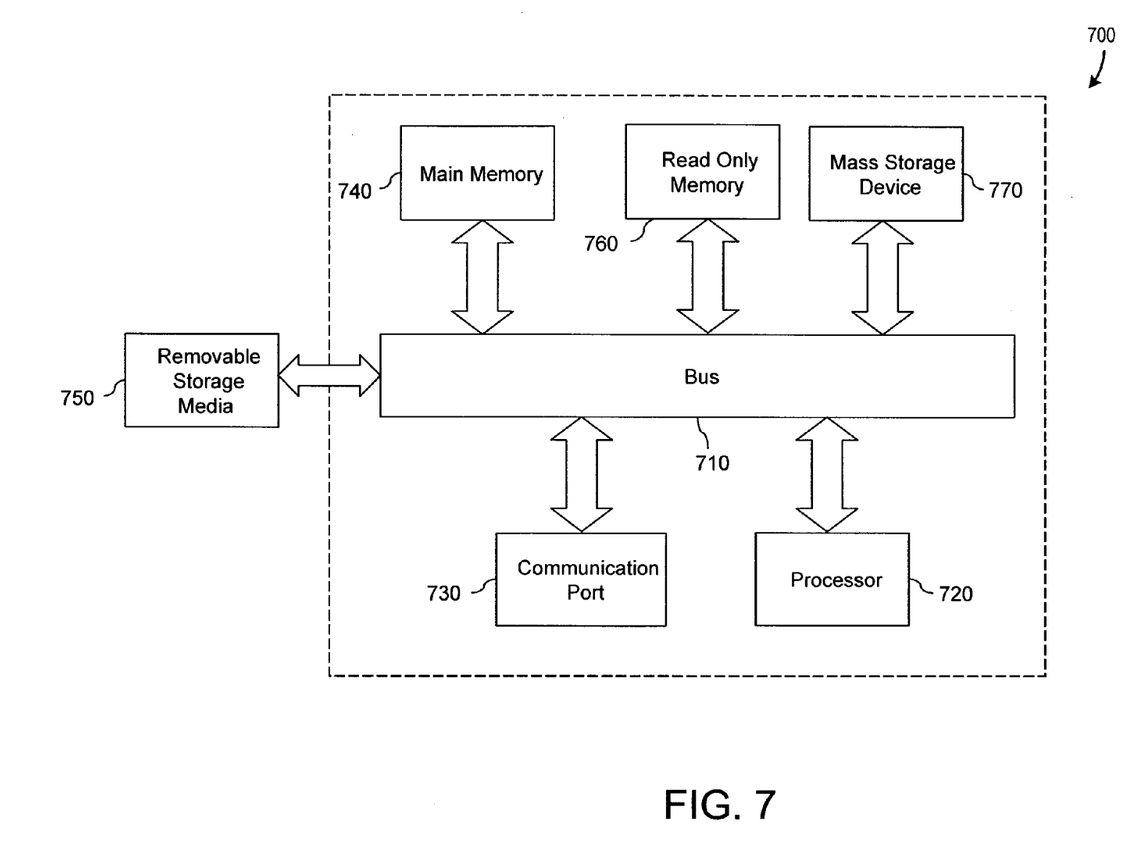
FIG. 7 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present invention may be utilized. According to the present example, the computer system includes a bus 710, at least one processor 720, at least one communication port 730, a main memory 740, a removable storage media 750, a read only memory 760, and a mass storage 770.

Processor(s) 720 can be any known processor, such as, but not limited to, an Intel® Itanium® or Itanium 2® processor(s); AMD® Opteron® or Athlon MP® processor(s); or Motorola® lines of processors. Communication port(s) 730 can be any of an RS-232 port for use with a modem-based dialup connection, a 10/100 Ethernet port, or a Gigabit port using copper or fiber. Communication port(s) 730 may be chosen depending on a network such as a Local Area Network (LAN), Wide Area Network (WAN), or any network to which the computer system 700 connects.

Main memory 740 can be Random Access Memory (RAM) or any other dynamic storage device(s) commonly known in the art. Read only memory 760 can be any static storage device(s) such as Programmable Read Only Memory (PROM) chips for storing static information such as instructions for processor 720.

Mass storage 770 can be used to store information and instructions. For example, hard disks such as the Adaptec® family of SCSI drives, an optical disc, an array of disks such as RAID, such as the Adaptec family of RAID drives, or any other mass storage devices may be used.

Bus 710 communicatively couples processor(s) 720 with the other memory, storage and communication blocks. Bus 710 can be a PCI/PCI-X or SCSI based system bus depending on the storage devices used.

Removable storage media 750 can be any kind of external hard-drives, floppy drives, IOMEGA® Zip Drives, Compact Disc-Read Only Memory (CD-ROM), Compact Disc-Re-Writable (CD-RW), and/or Digital Video Disk-Read Only Memory (DVD-ROM).

The components described above are meant to exemplify some types of possibilities. In no way should the aforementioned examples limit the scope of the invention, as they are only exemplary embodiments.

In conclusion, the present invention provides novel systems, methods and arrangements for creating tokens that allow for customized access to portions of data. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations that fall within the scope of the claims, together with all equivalents thereof. Therefore, the above description should not be taken as limiting the scope of the invention, which is defined by the appended claims.

What is claimed is:

1. A method, comprising:
assigning a set of default tokens to a user that include a default set of permissions or restrictions for access the data;
assigning, using a processor, a set of workflow specific tokens to the user in response to a workflow event, wherein the set of workflow specific tokens grant the user temporary access to a portion of data, wherein the set of workflow specific tokens and the default tokens include a cryptographic message authentication code (MAC);

receiving a request from a workflow tool to allow the user to access data; and using the workflow specific tokens assigned to the user to determine which portion of the data can be accessed, wherein the set of workflow specific tokens includes two or more workflow tokens that each provides access to a different portion of data, and the workflow specific tokens and the set of default tokens each includes a matching rule.

2. The method of claim 1, wherein the set of default tokens have a higher priority level than the set of workflow specific tokens.

3. The method of claim 1, further comprising using the cryptographic MAC to determine if the workflow specific tokens or the default tokens have been modified.

4. The method of claim 1, wherein the set of workflow specific tokens grant a second user temporary access to a second portion of data.

5. The method of claim 1, wherein the temporary access granted by the set of workflow tokens is not more than twenty-four hours.

6. A token-based access management system comprising:
a processor and memory; and
a database having data stored thereon, wherein the processor and memory is configured to execute:
a workflow engine to receive an event and generate a set of workflow specific tokens to temporarily grant access to a portion of the data in order to respond to the event, wherein the workflow specific tokens and a set of default tokens each includes a matching rule;
a communications module to associate the generated set of workflow specific tokens with a user; and
a set of tools configured to access the generated set of workflow specific tokens, verify that the user should be granted access to the portion of the data, and allow the user to access the portion of the data, wherein the workflow tokens and the set of default tokens each include a matching rule, wherein the set of workflow specific tokens includes two or more workflow tokens that each provides access to a different portion of data.

7. The token-based access management system of claim 6, wherein the set of tools provide tool constraints restricting access to the data based on a tool that is being used by the user.

8. The token-based access management system of claim 6, wherein the workflow specific tokens are assigned a cryptographic message authentication code and the system further comprising a verification module to authenticate the cryptographic message authentication code before allows the user to access the portion of the data.

9. The token-based access management system of claim 6, further comprising a reassignment module configured to receive a request from the user to reassign the event.

10. The token-based access management system of claim 7, further comprising a permission evaluation module configured to receive and evaluate a request from the user to access an additional portion of the data in order to respond to the event.

11. The token-based access management system of claim 6, wherein the workflow engine generates multiple workflow specific tokens.

12. The token-based access management system of claim 11, wherein the each of the multiple specific tokens are associated with different users.

13. The token-based access management system of claim 6, wherein further comprising a priority module to resolve access permissions based on multiple specific tokens assigned to the user.

14. A computer-implemented method comprising:
generating, using a processor, a set of default tokens for a specific user;
generating, using the processor, a set of workflow tokens based on a workflow event, wherein at least some of the workflow tokens are assigned to the specific user to allow the specific user temporary access to selected portions of a data set; and
determining, upon receiving a request, which portion of the data set the user can access based on the default tokens and workflow specific tokens assigned to the specific user, wherein the workflow specific tokens and the set of default tokens each include a matching rule, and the set of workflow specific tokens includes two or more workflow tokens that each provides access to a different portion of data.

15. The computer-implemented method of claim 14, wherein generating the set of default tokens for the specific user occurs on a predetermine schedule.

16. The computer-implemented method of claim 14, further comprising associating a deactivation event with the workflow token.

17. The computer-implemented method of claim 16, further comprising deactivating the workflow token upon detection of the deactivation event.

18. The computer-implemented method of claim 14, wherein the set of workflow tokens includes two or more workflow tokens that each provides access to a different portion of data.

* * * * *